(12) United States Patent
Ueda et al.

(10) Patent No.: US 11,594,771 B2
(45) Date of Patent: Feb. 28, 2023

(54) BATTERY PACKAGING MATERIAL, BATTERY, AND METHOD FOR PRODUCING BATTERY PACKAGING MATERIAL

(71) Applicant: DAI NIPPON PRINTING CO., LTD., Tokyo (JP)

(72) Inventors: Shunsuke Ueda, Tokyo (JP); Rikiya Yamashita, Tokyo (JP); Daisuke Watanabe, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 554 days.

(21) Appl. No.: 16/073,533

(22) PCT Filed: Feb. 17, 2017

(86) PCT No.: PCT/JP2017/005951
§ 371 (c)(1),
(2) Date: Jul. 27, 2018

(87) PCT Pub. No.: WO2017/142071
PCT Pub. Date: Aug. 24, 2017

(65) Prior Publication Data
US 2019/0036086 A1 Jan. 31, 2019

(30) Foreign Application Priority Data
Feb. 17, 2016 (JP) .............................. JP2016-028036

(51) Int. Cl.
*B32B 27/40* (2006.01)
*B65D 65/40* (2006.01)
(Continued)

(52) U.S. Cl.
CPC .............. *H01M 50/10* (2021.01); *B32B 15/08* (2013.01); *B32B 27/40* (2013.01); *B65D 65/40* (2013.01);
(Continued)

(58) Field of Classification Search
CPC ..... B32B 15/08; B32B 15/082; B32B 15/085; B32B 15/088; B32B 15/09; B32B 15/095;
(Continued)

(56) References Cited

U.S. PATENT DOCUMENTS 6,632,538 B1 * 10/2003 Yamazaki ........... H01M 2/0275
428/461
2008/0286635 A1 11/2008 Seino et al.
(Continued)

FOREIGN PATENT DOCUMENTS

JP H06-39974 A 2/1994
JP 2001-038858 A 2/2001
(Continued)

OTHER PUBLICATIONS

May 16, 2017 International Search Report issued in International Patent Application No. PCT/JP2017/005951.

*Primary Examiner* — Callie E Shosho
*Assistant Examiner* — Krupa Shukla
(74) *Attorney, Agent, or Firm* — Oliff PLC (57) ABSTRACT

A battery packaging material that is excellent in electrolytic solution resistance and ink printing characteristics of the surface. A battery packaging material comprising a laminate having at least a protective layer, a base material layer, a barrier layer, and a heat-sealable resin layer in this order, wherein a maximum value A of absorbance detected in an infrared wavenumber range of 2800 to 3000 cm$^{-1}$ and a maximum value B of absorbance detected in an infrared wavenumber range of 2200 to 2300 cm$^{-1}$ satisfy the relation: $0.05 \leq B/A \leq 0.75$, as measured from an outermost surface of the protective layer, using attenuated total reflection Fourier transform infrared spectroscopy.

8 Claims, 3 Drawing Sheets

(51) Int. Cl.
  *H01M 50/124*  (2021.01)
  *H01M 50/10*  (2021.01)
  *B32B 15/08*  (2006.01)
  *H01G 11/78*  (2013.01)
  *C09J 7/29*  (2018.01)

(52) U.S. Cl.
  CPC ............... *C09J 7/29* (2018.01); *H01G 11/78* (2013.01); *H01M 50/124* (2021.01); *B65D 2585/88* (2013.01); *C09J 2203/33* (2013.01); *C09J 2301/122* (2020.08); *C09J 2301/304* (2020.08); *C09J 2400/163* (2013.01); *C09J 2475/006* (2013.01); *Y02T 10/62* (2013.01)

(58) Field of Classification Search
  CPC ............... B32B 15/20; B32B 2255/20; B32B 2255/205; B32B 2255/26; B32B 2307/31; B32B 2307/7246; B32B 2307/75; B32B 2457/10; B32B 2553/00; B32B 27/08; B32B 27/325; B32B 27/36; B32B 27/40; B32B 7/12; B65D 2585/88; B65D 65/40; H01M 50/10; H01M 50/124
  See application file for complete search history.

(56) References Cited

U.S. PATENT DOCUMENTS

| | | | |
|---|---|---|---|
| 2012/0245246 A1* | 9/2012 | Yin | C09D 167/08 106/504 |
| 2013/0281572 A1* | 10/2013 | Shimizu | C09D 11/30 523/436 |
| 2014/0242333 A1 | 8/2014 | Oono et al. | |
| 2015/0380692 A1* | 12/2015 | Ojiri | B32B 27/08 429/176 |
| 2017/0088753 A1* | 3/2017 | Nakamura | B32B 27/24 |
| 2017/0092902 A1* | 3/2017 | Ueda | B65D 65/40 |

FOREIGN PATENT DOCUMENTS

| | | |
|---|---|---|
| JP | 2008-287971 A | 11/2008 |
| JP | 2014-29876 A | 2/2014 |
| JP | 2015-176764 A | 10/2015 |
| WO | 2013/069698 A1 | 5/2013 |

\* cited by examiner

BATTERY PACKAGING MATERIAL, BATTERY, AND METHOD FOR PRODUCING BATTERY PACKAGING MATERIAL

TECHNICAL FIELD

The present invention relates to a battery packaging material, a battery, and a method for producing a battery packaging material.

BACKGROUND ART

Various types of batteries have been heretofore developed, and in every battery, a packaging material is an essential member for sealing battery elements such as an electrode and an electrolyte. Metallic packaging materials have been heretofore widely used as battery packaging materials. In recent years, batteries have been required to be diversified in shape, and to be thinner and lighter weight, along with improvements in the performance of electric cars, hybrid electric cars, personal computers, cameras, mobile phones, and the like. However, the widely used metallic battery packaging materials are disadvantageous in that they have difficulty in keeping up with the diversification of shapes, and are limited in weight reduction.

Thus, a film-shaped battery packaging material in which a base material layer/an adhesive layer/a barrier layer/a heat-sealable resin layer are laminated in this order has been proposed as a battery packaging material that can be readily processed into various shapes, and can achieve a reduction in thickness and weight (see, for example, Patent Literature 1). This film-shaped battery packaging material is formed such that the battery elements can be sealed by heat-welding, by means of heat-sealing, the peripheral region with the heat-sealable resin layer being opposed to itself.

In the production of a battery using the battery packaging material as described above, the electrolytic solution may adhere to the base material layer positioned on the surface of the outermost layer of the battery packaging material. If the electrolytic solution adheres to the base material layer, the base material layer may become discolored. Thus, a protective layer having electrolytic solution resistance or the like may be provided on the base material layer.

Furthermore, for the purpose of imparting discriminability to the battery packaging material, a method for forming a print on the battery packaging material is widely adopted in which an ink is printed on the base material layer-side surface of the battery packaging material to form a bar code, a pattern, characters, or the like, and an adhesive and metal foil are laminated on the printed side of the base material layer (this method is generally referred to as reverse printing). However, the presence of this printed surface between the base material layer and the barrier layer reduces the adhesion between the base material layer and the barrier layer, which tends to cause delamination between these layers. In particular, since high safety is required in batteries to which the battery packaging material is applied, this method that forms a print by reverse printing is avoided for the battery packaging material. Thus, conventionally, for the formation of a print such as a bar code on the battery packaging material, a method in which a seal with a print formed thereon is attached to the base material layer-side surface is generally adopted.

However, when such a seal with a print formed thereon is attached to the base material layer-side surface, the thickness and weight of the battery packaging material increase. Thus, in view of the recent tendency toward a further reduction in thickness and weight in the battery packaging material, research has been conducted on a method in which a print is formed by printing an ink directly on the base material layer-side surface of the battery packaging material.

Pad printing (also referred to as tampo printing), for example, is known as such a method in which a print is formed by printing an ink directly on the base material layer-side surface of the battery packaging material. Pad printing is a printing method as described below: Initially, an ink is poured into a concave portion of a flat plate etched with the pattern to be printed. Then, a silicon pad is pressed against the concave portion to transfer the ink to the silicon pad. Then, the ink transferred to the silicon pad surface is transferred to the medium to be printed to form a print thereon. Pad printing as described above uses an elastic silicon pad or the like to transfer an ink to the medium to be printed, and therefore, is advantageous in that printing can be readily performed on the surface of the battery packaging material after molding, and a print can be formed on a battery after the battery elements are sealed with the battery packaging material.

CITATION LIST

Patent Literature

Patent Literature 1: JP 2008-287971 A

SUMMARY OF INVENTION

Technical Problem

As described above, if the electrolytic solution adheres to the base material layer, the base material layer may become discolored. Thus, a protective layer having electrolytic solution resistance or the like may be provided on the base material layer. As such a protective layer, for example, a protective layer formed by curing using a curing agent such as an isocyanate group-containing curing agent is known (for example, WO 2013/069698). However, as a result of research conducted by the inventors of the present invention, it was revealed that when the protective layer formed by curing using an isocyanate group-containing curing agent is provided, if the reaction of isocyanate groups is insufficient (if a large number of unreacted isocyanate groups remain), electrolytic solution resistance may not be achieved, and if, on the other hand, the reaction of isocyanate groups proceeds excessively (if no unreacted isocyanate remains), even though the electrolytic solution resistance is improved, when an ink is to be printed on the surface of the protective layer, the surface of the protective layer rejects the ink, and the ink is unlikely to be fixed, which may result in an unprinted portion where the ink is not formed. In particular, in was revealed that printability in the case of printing by pad printing tends to be insufficient.

Under such circumstances, it is a main object of the present invention to provide a battery packaging material that is excellent in electrolytic solution resistance and ink printing characteristics of the surface. It is another object of the present invention to provide a method for producing the battery packaging material and a battery comprising the battery packaging material.

Solution to Problem

The inventors of the present invention conducted extensive research to solve the aforementioned problem. As a result, they found that a battery packaging material comprising a laminate having at least a protective layer, a base material layer, a barrier layer, and a heat-sealable resin layer in this order, wherein a maximum value A of absorbance detected in an infrared wavenumber range of 2800 to 3000 cm$^{-1}$ and a maximum value B of absorbance detected in an infrared wavenumber range of 2200 to 2300 cm$^{-1}$ satisfy the relation: 0.05≤B/A≤0.75, as measured from an outermost surface of the protective layer, using attenuated total reflection Fourier transform infrared spectroscopy, is excellent not only in electrolytic solution resistance, but also in ink printing characteristics. The present invention was completed as a result of further research based on these findings.

In summary, the present invention provides aspects of invention as itemized below:

Item 1. A battery packaging material comprising a laminate having at least a protective layer, a base material layer, a barrier layer, and a heat-sealable resin layer in this order, wherein a maximum value A of absorbance detected in an infrared wavenumber range of 2800 to 3000 cm$^{-1}$ and a maximum value B of absorbance detected in an infrared wavenumber range of 2200 to 2300 cm$^{-1}$ satisfy the relation: 0.05≤B/A≤0.75, as measured from an outermost surface of the protective layer, using attenuated total reflection Fourier transform infrared spectroscopy.

Item 2. The battery packaging material according to item 1, wherein the protective layer comprises an isocyanate group-containing compound.

Item 3. The battery packaging material according to item 1 or 2, wherein the protective layer comprises a urethane resin formed of at least one polyol selected from the group consisting of polyester polyols and acrylic polyols each having a hydroxyl group-containing group as a side chain, and an isocyanate group-containing compound.

Item 4. The battery packaging material according to any one of items 1 to 3, which is used by printing an ink on at least a portion of the surface of the protective layer.

Item 5. The battery packaging material according to any one of items 1 to 4, which comprises an information-carrying portion composed of an ink on at least a portion of the surface of the protective layer.

Item 6. The battery packaging material according to any one of items 1 to 5, which comprises an adhesive layer between the base material layer and the barrier layer.

Item 7. The battery packaging material according to any one of items 1 to 6, which comprises an adhesive layer between the barrier layer and the heat-sealable resin layer.

Item 8. The battery packaging material according to any one of items 1 to 7, wherein the barrier layer is formed of aluminum foil.

Item 9. A battery comprising a battery element comprising at least a positive electrode, a negative electrode, and an electrolyte, the battery element being housed in a package formed of the battery packaging material according to any one of items 1 to 8.

Item 10. A method for producing a battery packaging material comprising:

a lamination step of laminating at least a protective layer, a base material layer, a barrier layer, and a heat-sealable resin layer to obtain a laminate; and a curing step of curing the protective layer, wherein
in the curing step, the protective layer is cured such that a maximum value A of absorbance detected in an infrared wavenumber range of 2800 to 3000 cm$^{-1}$ and a maximum value B of absorbance detected in an infrared wavenumber range of 2200 to 2300 cm$^{-1}$ satisfy the relation: 0.05≤B/A≤0.75, as measured from an outermost surface of the protective layer, using attenuated total reflection Fourier transform infrared spectroscopy.

Advantageous Effects of Invention

According to the present invention, a battery packaging material can be provided that is excellent in electrolytic solution resistance and ink printing characteristics of the surface. Furthermore, according to the present invention, a battery comprising the battery packaging material and a method for producing the battery packaging material can also be provided.

DESCRIPTION OF EMBODIMENTS

A battery packaging material of the present invention comprises a laminate having at least a protective layer, a base material layer, a barrier layer, and a heat-sealable resin layer in this order, wherein a maximum value A of absorbance detected in an infrared wavenumber range of 2800 to 3000 cm$^{-1}$ and a maximum value B of absorbance detected in an infrared wavenumber range of 2200 to 2300 cm$^{-1}$ satisfy the relation: 0.05≤B/A≤0.75, as measured from an outermost surface of the protective layer, using attenuated total reflection Fourier transform infrared spectroscopy. The battery packaging material of the present invention, a method for producing the battery packaging material, and a battery comprising the battery packaging material will be hereinafter described in detail.

In the present specification, any numerical range indicated by " . . . to . . . " is intended to mean " . . . or more" and " . . . or less". For example, the recitation "2 to 15 mm" is intended to mean 2 mm or more and 15 mm or less.

1. Laminated Structure of Battery Packaging Material

Figure 1:
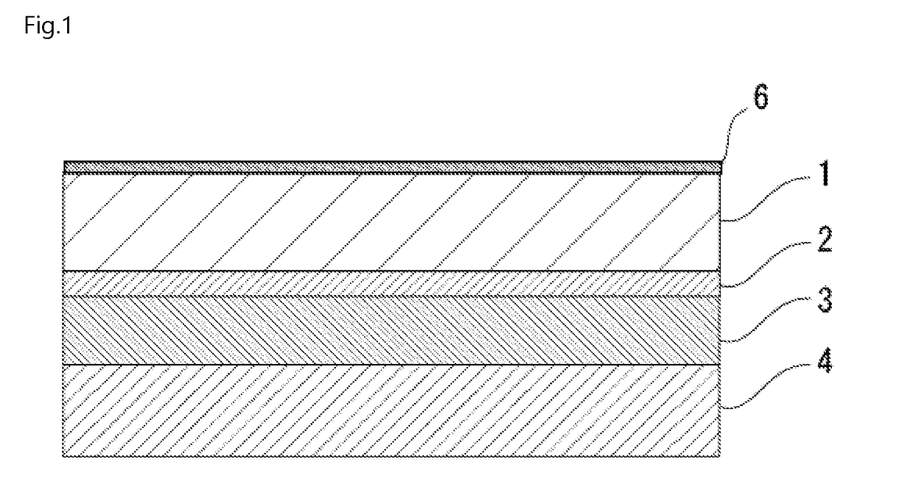
FIG. 1 is a diagram showing one example of a cross-sectional structure of a battery packaging material of the present invention.

As shown in FIG. 1, a battery packaging material of the present invention comprises a laminate having at least a protective layer 6, a base material layer 1, a barrier layer 3, and a heat-sealable resin layer 4 in this order. In the battery packaging material of the present invention, the protective layer 6 is an outermost layer, and the heat-sealable resin layer 4 is an innermost layer. That is, during the assembly of a battery, the heat-sealable resin layer 4 positioned on the periphery of a battery element is heat-welded with itself to hermetically seal the battery element, such that the battery element is encapsulated.

Figure 2:
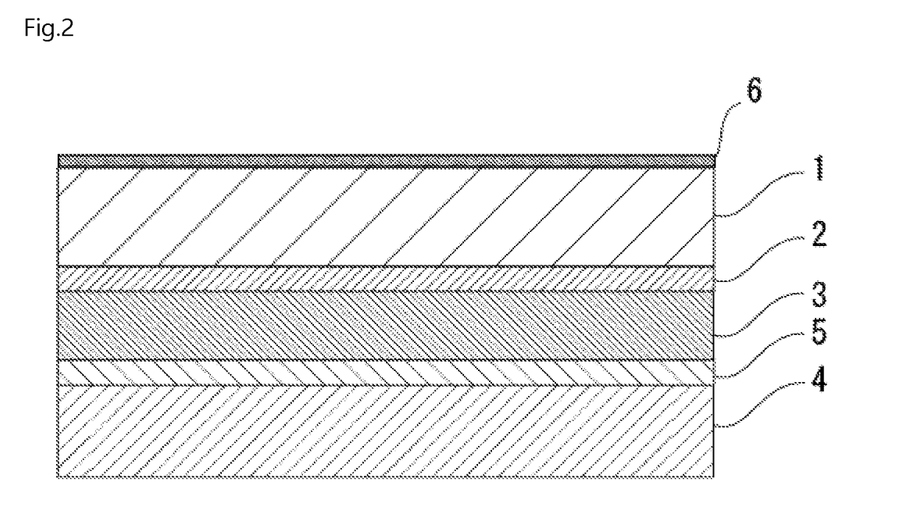
FIG. 2 is a diagram showing one example of a cross-sectional structure of a battery packaging material of the present invention.

As shown in FIG. 1, the battery packaging material of the present invention may optionally include an adhesive layer 2 between the base material layer 1 and the barrier layer 3, in order to improve the adhesion between these layers. Furthermore, as shown in FIG. 2, the battery packaging material of the present invention may also optionally include an adhesive layer 5 between the barrier layer 3 and the heat-sealable resin layer 4, in order to improve the adhesion between these layers.

While the total thickness of the battery packaging material of the present invention is not particularly limited, it is preferably about 50 to 200 μm, and more preferably about 60 to 160 μm.

2. Compositions of Layers that Form Battery Packaging Material [Protective Layer 6]

In the battery packaging material of the present invention, the protective layer 6 is provided for the purpose of, for example, improving the electrolytic solution resistance and ink printing characteristics. The protective layer 6 is positioned as an outermost layer (opposite to the heat-sealable resin layer) upon assembly of a battery.

In the present invention, the maximum value A of absorbance detected in an infrared wavenumber range of 2800 to 3000 $cm^{-1}$ and the maximum value B of absorbance detected in an infrared wavenumber range of 2200 to 2300 $cm^{-1}$ satisfy the relation: $0.05 \leq B/A \leq 0.75$, as measured from an outermost surface of the protective layer, using attenuated total reflection (ATR) Fourier transform infrared spectroscopy (FT-IR). As used herein, the maximum value of absorbance refers to a maximum value of absorbance as measured using attenuated total reflection Fourier transform infrared spectroscopy, under the following conditions: accumulation times: 32, wavenumber resolution: 4 $cm^{-1}$.

The maximum value of absorbance detected in an infrared wavenumber range of 2800 to 3000 $cm^{-1}$ mainly represents a maximum value of absorbance derived from the C—H stretching vibration. The maximum value of absorbance detected in an infrared wavenumber range of 2200 to 2300 $cm^{-1}$ mainly represents a maximum value of absorbance derived from the N=C=O stretching vibration. Specific measurement conditions for attenuated total reflection Fourier transform infrared spectroscopy are as set forth below. The "range of 2800 to 3000 $cm^{-1}$" includes 2800 $cm^{-1}$ and 3000 $cm^{-1}$, and the "range of 2200 to 2300 $cm^{-1}$" includes 2200 $cm^{-1}$ and 2300 $cm^{-1}$.

(Measurement Conditions for Attenuated Total Reflection Fourier Transform Infrared Spectroscopy)

Prism: germanium
Wavenumber resolution: 4 $cm^{-1}$
Accumulation times: 32

Maximum value A of absorbance: a baseline is drawn by connecting between wavenumbers of 2750 and 3100 $cm^{-1}$ with a straight line, and the intensity from the baseline to the maximum value of absorbance in the range of 2800 to 3000 $cm^{-1}$ is determined as the maximum value A of absorbance.

Maximum value B of absorbance: a baseline is drawn by connecting between wavenumbers of 2000 and 2500 $cm^{-1}$ with a straight line, and the intensity from the baseline to the maximum value of absorbance in the range of 2200 to 2300 $cm^{-1}$ is determined as the maximum value B of absorbance.

The absorption derived from the C—H stretching vibration detected in an infrared wavenumber range of 2800 to 3000 $cm^{-1}$, as measured using attenuated total reflection Fourier transform infrared spectroscopy, mainly originates from the resin (base resin that reacts with a curing agent) forming the protective layer 6. The absorption derived from the N=C=O stretching vibration detected in an infrared wavenumber range of 2200 to 2300 $cm^{-1}$ mainly originates from an isocyanate group-containing compound (curing agent). That is, the protective layer 6 preferably contains an isocyanate group-containing compound (for example, a portion of the isocyanate group-containing compound used as a curing agent remains unreacted with the base resin). Furthermore, the protective layer 6 preferably contains a urethane resin formed of at least one polyol (base resin) selected from the group consisting of polyester polyols and acrylic polyols each having a hydroxyl group-containing group as a side chain, and an isocyanate group-containing compound. For example, because a predetermined number of unreacted isocyanate groups in the curing agent remain in the battery packaging material of the present invention, the electrolytic solution resistance of the protective layer 6 is improved, and an ink can be readily fixed on the surface of the protective layer 6 to further improve the ink printing characteristics.

In order to further improve the electrolytic solution resistance and the ink printing characteristics of the battery packaging material of the present invention, the maximum value A of absorbance and the maximum value B of absorbance preferably satisfy the relation: $0.10 \leq B/A \leq 0.70$. Furthermore, in order to improve abrasion resistance in addition to the electrolytic solution resistance and ink printing characteristics, the maximum value A of absorbance and the maximum value B of absorbance particularly preferably satisfy the relation: $0.10 \leq B/A \leq 0.60$.

Examples of the resin (base resin that reacts with a curing agent) forming the protective layer 6 in the battery packaging material of the present invention include those having functional groups (for example, hydroxyl groups or amino groups) that react with the below-described isocyanate group-containing compound (curing agent), for example, polyol compounds such as polyester polyols and acrylic polyols.

Examples of polyester polyols include polyester polyols obtained by reacting one or more dibasic acids with one or more compounds having three or more hydroxyl groups. The unreacted site of the hydroxyl groups of the compound having three or more hydroxyl groups corresponds to the hydroxyl group in the side chain of the polyester polyol.

Examples of dibasic acids include aliphatic dibasic acids such as succinic acid, glutaric acid, adipic acid, pimelic acid, suberic acid, azelaic acid, sebacic acid, and brassylic acid; and aromatic dibasic acids such as isophthalic acid, terephthalic acid, and naphthalenedicarboxylic acid.

Examples of compounds having three or more hydroxyl groups include hexanetriol, trimethylolpropane, and pentaerythritol.

As a polyester polyol, a compound obtained by reacting a diol, as required, in addition to the dibasic acid and the compound having three or more hydroxyl groups, may also be used. Examples of diols include aliphatic diols such as ethylene glycol, propylene glycol, butanediol, neopentyl glycol, methyl pentanediol, hexanediol, heptanediol, octanediol, nonanediol, decanediol, and dodecanediol; alicyclic diols such as cyclohexanediol and hydrogenated xylylene glycol; and aromatic diols such as xylylene glycol.

Examples of acrylic polyols include copolymers containing, as a main component, a repeating unit derived from (meth)acrylic acid, obtained by copolymerizing at least a hydroxyl group-containing acrylic monomer and (meth)acrylic acid.

Examples of hydroxyl group-containing acrylic monomers include 2-hydroxyethyl (meth)acrylate and 2-hydroxypropyl (meth)acrylate. Examples of components that copolymerize with the hydroxyl group-containing acrylic monomer and (meth)acrylic acid include alkyl (meth)acrylate-based monomers (examples of alkyl groups include methyl, ethyl, n-propyl, i-propyl, n-butyl, i-butyl, t-butyl, 2-ethylhexyl, and cyclohexyl groups); amide group-containing monomers such as (meth)acrylamide, N-alkyl (meth)acrylamide, N,N-dialkyl (meth)acrylamide (examples of alkyl groups include methyl, ethyl, n-propyl, i-propyl, n-butyl, i-butyl, t-butyl, 2-ethylhexyl, and cyclohexyl groups), N-alkoxy (meth)acrylamide, N,N-dialkoxy (meth) acrylamide (examples of alkoxy groups include methoxy, ethoxy, butoxy, and isobutoxy groups), N-methylol (meth) acrylamide, and N-phenyl (meth)acrylamide; glycidyl group-containing monomers such as glycidyl (meth)acrylate and allyl glycidyl ether; silane-containing monomers such as (meth)acryloxypropyltrimethoxysilane and (meth)acryloxypropyltriethoxysilane; and isocyanate group-containing monomers such as (meth)acryloxypropyl isocyanate.

These polyol compounds can be used alone or in combinations of two or more, in accordance with the required function and performance. The protective layer 6 formed of a polyurethane resin is obtained using any of these polyol compounds (base resin) and an isocyanate group-containing compound (curing agent).

Acrylic polyols, which have excellent electrolytic solution resistance, are preferred as polyol compounds.

In the present invention, the resin contained in the protective layer 6 may be one in which all the functional groups that can react with isocyanate groups have reacted with the isocyanate group-containing compound (curing agent), or one containing functional group(s) unreacted with the curing agent (for example, one in which at least a portion of the hydroxyl groups of the polyol compound remain).

The isocyanate group-containing curing agent is not particularly limited, and known isocyanate compounds can be used as the curing agent. Specific examples of isocyanate compounds include aliphatic diisocyanates such as hexamethylene diisocyanate (HMDI) and trimethylhexamethylene diisocyanate (TMDI); alicyclic diisocyanates such as isophorone diisocyanate (IPDI); aromatic and aliphatic diisocyanates such as xylylene diisocyanate (XDI); aromatic diisocyanates such as tolylene diisocyanate (TDI) and 4,4-diphenylmethane diisocyanate (MDI); hydrogenated diisocyanates such as dimer acid diisocyanate (DDI), hydrogenated TDI (HTDI), hydrogenated XDI (H6XDI), and hydrogenated MDI (H12MDI); dimers and trimers of these diisocyanate compounds, as well as polyisocyanates with higher molecular weights; and adducts with polyhydric alcohols such as trimethylolpropane or water, or low-molecular-weight polyester resins. These curing agents may be used alone or in combinations of two or more.

Examples of methods for forming the protective layer 6 include, but are not particularly limited to, a method in which a resin composition containing the base resin and the isocyanate group-containing curing agent is applied to one surface of the base material layer 1, and a portion of the curing agent is cured by heating, light irradiation, or the like.

While the thickness of the protective layer 6 is not particularly limited, it is preferably about 0.5 to 10 μm, and more preferably about 1 to 5 μm, in order to further improve the electrolytic solution resistance and the ink printing characteristics.

The protective layer 6 may contain additives. Examples of additives include particles with a particle diameter of about 0.5 nm to 5 μm. Examples of materials of the additives include, but are not particularly limited to, metals, metal oxides, inorganic substances, and organic substances. Furthermore, examples of shapes of the additives include, but are not particularly limited to, a spherical shape, a fibrous shape, a plate shape, an amorphous shape, and a balloon shape. Specific examples of the additives include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrene, crosslinked polyethylene, benzoguanamine, gold, aluminum, copper, and nickel. These additives may be used alone or in combinations of two or more. Among these additives, silica, barium sulfate, and titanium oxide are preferred in view of their dispersion stability, costs, and the like. The surface of the additives may be subjected to various types of surface treatments, such as an insulation treatment and a dispersibility enhancing treatment.

While the content of the additives in the protective layer 6 is not particularly limited, it is preferably about 5 to 30% by mass, and more preferably about 10 to 20% by mass.

Furthermore, in the step of fixing a battery to a protective case made of plastic or the like, the step of fixing the battery packaging material to the protective case with an adhesive tape is performed. Adding an additive (for example, a filler such as silica particles) to the protective layer 6 to form irregularities on the surface of the protective layer 6 is advantageous in that the bonded area between the adhesive tape and the protective layer 6 is increased, and the battery packaging material can be more firmly fixed to the protective case.

In the battery packaging material of the present invention, an ink can be favorably printed on at least a portion of the surface of the protective layer 6. That is, in the present invention, on the battery packaging material in which an ink is printed on the surface of the protective layer 6, the ink (ink in a cured form, a dried form, or the like) printed on the surface of the protective layer 6 is exposed. The printed ink can form an information-carrying portion with a printed bar code, a printed pattern, or printed characters, for example. The battery packaging material may comprise an information-carrying portion composed of an ink on at least a portion of the surface of the protective layer 6. The ink to be used for printing is not particularly limited, and known inks can be used as the ink; for example, photocurable inks that are cured by irradiation of ultraviolet light or the like, inkjet inks used for inkjet printers or the like, and so on can be used. The ink typically contains a component having functional groups that react with isocyanate groups, such as hydroxyl groups or amino groups.

[Base Material Layer 1]

In the battery packaging material of the present invention, the base material layer 1 is a layer positioned between the protective layer 6 and the barrier layer 3.

The material that forms the base material layer 1 is not particularly limited so long as it has insulation properties. Examples of materials that form the base material layer 1 include polyesters, polyamides, epoxy resins, acrylic resins, fluororesins, polyurethanes, silicone resins, phenol resins, polyether imides, polyimides, and mixtures or copolymers thereof.

Specific examples of polyesters include polyethylene terephthalate, polybutylene terephthalate, polyethylene naphthalate, polybutylene naphthalate, polyethylene isophthalate, copolyesters containing ethylene terephthalate as a main repeating unit, and copolyesters containing butylene terephthalate as a main repeating unit. Specific examples of copolyesters containing ethylene terephthalate as a main repeating unit include copolyesters obtained by polymerizing ethylene isophthalate with ethylene terephthalate as a main repeating unit (abbreviated as polyethylene (terephthalate/isophthalate); hereinafter abbreviations are made in the same manner), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Specific examples of copolyesters containing butylene terephthalate as a main repeating unit include copolyesters obtained by polymerizing butylene isophthalate with butylene terephthalate as a main repeating unit (abbreviated as polybutylene (terephthalate/isophthalate); hereinafter abbreviations are made in the same manner), polybutylene (terephthalate/adipate), polybutylene (terephthalate/sebacate), polybutylene (terephthalate/decane dicarboxylate), and polybutylene naphthalate. These polyesters may be used alone or in combinations of two or more. Polyesters are suitably used as the material that forms the base material layer 1, because they have the advantage of having excellent electrolytic solution resistance, and being unlikely to cause whitening or the like due to deposition of the electrolytic solution.

Specific examples of polyamides include aliphatic polyamides such as nylon 6, nylon 66, nylon 610, nylon 12, nylon 46, and copolymers of nylon 6 and nylon 66; polyamides containing aromatics such as hexamethylenediamine-isophthalic acid-terephthalic acid copolyamides containing a structural unit derived from terephthalic acid and/or isophthalic acid, such as nylon 6I, nylon 6T, nylon 6IT, and nylon 6I6T (I denotes isophthalic acid, and T denotes terephthalic acid), and polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers or polyether ester amide copolymers that are copolymers of copolyamides and polyesters or polyalkylene ether glycol; and copolymers thereof. These polyamides may be used alone or in combinations of two or more. Stretched polyamide films are suitably used as the material that forms the base material layer 1, because they have excellent stretchability, and can prevent the occurrence of whitening due to resin breakage in the base material layer 1 during molding.

The base material layer 1 may be formed of a uniaxially or biaxially stretched resin film, or may be formed of an unstretched resin film. Among the above, a uniaxially or biaxially stretched resin film, particularly a biaxially stretched resin film, is suitably used as the base material layer 1, because it has improved heat resistance through oriented crystallization. The base material layer 1 may be formed by coating the barrier layer 3 with the above-described material.

Among the above, nylons and polyesters are preferred, biaxially stretched nylons and biaxially stretched polyesters are more preferred, and biaxially stretched nylons are particularly preferred, as the resin film that forms the base material layer 1.

The thickness of the base material layer 1 is, for example, about 5 to 50 µm, and preferably about 15 to 30 µm.

[Adhesive Layer 2]

In the battery packaging material of the present invention, the adhesive layer 2 is a layer that is optionally provided to bond the base material layer 1 and the barrier layer 3.

The adhesive layer 2 is formed of an adhesive capable of bonding the base material layer 1 and the barrier layer 3. The adhesive to be used for forming the adhesive layer 2 may be a two-liquid curable adhesive or a one-liquid curable adhesive. Furthermore, the adhesion mechanism of the adhesive used for forming the adhesive layer 2 is not particularly limited, and may be any of a chemical reaction type, a solvent volatilization type, a heat melting type, a heat pressing type, and the like.

Specific examples of resin components of adhesives usable for forming the adhesive layer 2 include polyester-based resins such as polyethylene terephthalate, polybutylene terephthalate, polyethylene naphthalate, polybutylene naphthalate, polyethylene isophthalate, polycarbonate, and copolyesters; polyether-based adhesives; polyurethane-based adhesives; epoxy-based resins; phenol-based resins; polyamide-based resins such as nylon 6, nylon 66, nylon 12, and copolyamides; polyolefin-based resins such as polyolefins, acid-modified polyolefins, and metal-modified polyolefins; polyvinyl acetate-based resins; cellulose-based adhesives; (meth)acrylic-based resins; polyimide-based resins; amino resins such as urea resins and melamine resins; rubbers such as chloroprene rubber, nitrile rubber, and styrene-butadiene rubber; silicone-based resins; and fluorinated ethylene propylene copolymer. These adhesive components may be used alone or in combinations of two or more. While the combinations of two or more adhesive components are not particularly limited, examples include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among the above, preferred examples include polyurethane-based two-liquid curable adhesives; and polyamides, polyesters, or blend resins of these resins and modified polyolefins, because they are excellent in ductility, durability and yellowing-inhibiting action under high-humidity conditions, thermal degradation-inhibiting action during heat-sealing, and the like, and effectively suppress the occurrence of delamination by preventing a decrease in the lamination strength between the base material layer 1 and the barrier layer 3.

The adhesive layer 2 may be multilayered with different adhesive components. When the adhesive layer 2 is multilayered with different adhesive components, in order to improve the lamination strength between the base material layer 1 and the barrier layer 3, it is preferred to select a resin having excellent adhesion to the base material layer 1 as the adhesive component to be disposed on the base material layer 1 side, and select an adhesive component having excellent adhesion to the barrier layer 3 as the adhesive component to be disposed on the barrier layer 3 side. When the adhesive layer 2 is multilayered with different adhesive components, specific examples of preferred adhesive components to be disposed on the barrier layer 3 side include acid-modified polyolefins, metal-modified polyolefins, mixed resins of polyesters and acid-modified polyolefins, and resins containing copolyesters.

The thickness of the adhesive layer 2 is, for example, about 2 to 50 µm, and preferably about 3 to 25 µm.

[Barrier Layer 3]

In the battery packaging material, the barrier layer 3 is a layer that serves to improve the strength of the battery packaging material, and prevent the ingress of water vapor, oxygen, light, and the like into the battery. Specific examples of metals that form the barrier layer 3 include aluminum, stainless steel, and titanium, with aluminum being preferred. The barrier layer 3 can be formed of, for example, metal foil or a vapor-deposited metal film, a vapor-deposited inorganic oxide film, a vapor-deposited carbon-containing inorganic oxide film, or a film provided with any of these vapor-deposited films. The barrier layer 3 is preferably formed of metal foil, and more preferably formed of aluminum alloy foil. In order to prevent the generation of creases and pinholes in the barrier layer 3 during the production of the battery packaging material, the barrier layer is preferably formed of soft aluminum alloy foil, for example, annealed aluminum (JIS H4160: 1994 A8021 H—O, JIS H4160: 1994 A8079 H—O, JIS H4000: 2014 A8021 P—O, and JIS H4000: 2014 A8079 P—O).

The thickness of the barrier layer 3 is, for example, about 10 to 200 μm, and preferably about 20 to 100 μm.

Furthermore, the barrier layer 3 is preferably subjected to a chemical conversion treatment on at least one surface, preferably the surface having the heat-sealable resin layer 4, and more preferably both surfaces, in order to stabilize the adhesion, and prevent dissolution or corrosion, for example. As used herein, the chemical conversion treatment refers to a treatment for forming an acid resistance film on a surface of the barrier layer 3. Examples of the chemical conversion treatment include a chromate treatment using a chromium compound such as chromium nitrate, chromium fluoride, chromium sulfate, chromium acetate, chromium oxalate, chromium biphosphate, acetylacetate chromate, chromium chloride, or chromium potassium sulfate; a phosphoric acid treatment using a phosphoric acid compound such as sodium phosphate, potassium phosphate, ammonium phosphate, or polyphosphoric acid; and a chromate treatment using an aminated phenol polymer having any of the repeating units represented by the following general formulae (1) to (4). The aminated phenol polymer may contain the repeating units represented by the following general formulae (1) to (4) alone or in any combinations of two or more.

In the general formulae (1) to (4), X represents a hydrogen atom, a hydroxyl group, an alkyl group, a hydroxyalkyl group, an allyl group, or a benzyl group. $R^1$ and $R^2$ are the same or different, and each represent a hydroxyl group, an alkyl group, or a hydroxyalkyl group. In the general formulae (1) to (4), examples of alkyl groups represented by X, $R^1$, and $R^2$ include linear or branched alkyl groups having 1 to 4 carbon atoms, such as a methyl group, an ethyl group, a n-propyl group, an isopropyl group, a n-butyl group, an isobutyl group, and a tert-butyl group. Examples of hydroxyalkyl groups represented by X, $R^1$, and $R^2$ include linear or branched alkyl groups having 1 to 4 carbon atoms, which are substituted with one hydroxy group such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, or a 4-hydroxybutyl group. In the general formulae (1) to (4), X is preferably a hydrogen atom, a hydroxyl group, or a hydroxyalkyl group. The number average molecular weight of the aminated phenol polymer having any of the repeating units represented by the general formulae (1) to (4) is, for example, about 500 to 1000000, preferably about 1000 to 20000.

Examples of chemical conversion treatment methods for imparting corrosion resistance to the barrier layer 3 include a method in which the barrier layer 3 is coated with a dispersion of fine particles of a metal oxide such as aluminum oxide, titanium oxide, cerium oxide, or tin oxide, or barium sulfate in phosphoric acid, and baked at about 150° C. or higher to form an anticorrosive-treated layer on a surface of the barrier layer 3. A resin layer obtained by crosslinking a cationic polymer with a crosslinking agent may also be formed on the anticorrosive-treated layer. Examples of the cationic polymer herein include polyethyleneimine, ion polymer complexes composed of polymers containing polyethyleneimine and carboxylic acids, primary amine-grafted acrylic resins obtained by grafting primary amines to an acrylic backbone, polyallylamine or derivatives thereof, and aminophenol. These cationic polymers may be used alone or in combinations of two or more. Examples of crosslinking agents include compounds having at least one functional group selected from the group consisting of an isocyanate group, a glycidyl group, a carboxyl group, and an oxazoline group, and silane coupling agents. These crosslinking agents may be used alone or in combinations of two or more.

These chemical conversion treatments may be performed alone or in combinations of two or more. Furthermore, these chemical conversion treatments may be performed using one compound alone, or using two or more compounds in combination. Among these chemical conversion treatments, a chromic acid treatment is preferred, and a chemical conversion treatment using a chromium compound, a phosphoric acid compound, and the aminated phenol polymer in combination is more preferred. Among chromium compounds, a chromic acid compound is preferred.

The amount of the acid resistance film to be formed on a surface of the barrier layer 3 in the chemical conversion treatment is not particularly limited; for example, when a chromate treatment is performed using a chromic acid compound, a phosphoric acid compound, and the aminated phenol polymer in combination, it is preferred that the chromic acid compound be contained in an amount of about 0.5 to 50 mg, preferably about 1.0 to 40 mg, calculated as chromium, the phosphoric acid compound be contained in an amount of about 0.5 to 50 mg, preferably about 1.0 to 40 mg, calculated as phosphorus, and the aminated phenol polymer be contained in an amount of about 1 to 200 mg, preferably about 5.0 to 150 mg, per m$^2$ of the surface of the barrier layer 3.

The chemical conversion treatment is performed by applying the compound-containing solution to be used for forming the acid resistance film to a surface of the barrier layer 3, using a bar coating method, a roll coating method, a gravure coating method, an immersion method, or the like, followed by heating such that the temperature of the barrier layer 3 becomes about 70 to 200° C. Moreover, before the barrier layer 3 is subjected to the chemical conversion treatment, the barrier layer 3 may be subjected to a degreasing treatment using an alkali immersion method, an electrolytic cleaning method, an acid cleaning method, an electrolytic acid cleaning method, or the like. The degreasing treatment allows the chemical conversion treatment of the surface of the barrier layer 3 to be more efficiently performed.

[Heat-Sealable Resin Layer 4]

In the battery packaging material of the present invention, the heat-sealable resin layer 4 is a layer that corresponds to an innermost layer, and is heat-welded with itself during the assembly of a battery to hermetically seal the battery element.

While the resin component to be used for the heat-sealable resin layer 4 is not particularly limited so long as it can be heat-welded, examples include a polyolefin, a cyclic polyolefin, a carboxylic acid-modified polyolefin, and a carboxylic acid-modified cyclic polyolefin.

Specific examples of the polyolefin include polyethylene such as low-density polyethylene, medium-density polyethylene, high-density polyethylene, and linear low-density polyethylene; polypropylene such as homopolypropylene, block copolymers of polypropylene (for example, block copolymers of propylene and ethylene), and random copolymers of polypropylene (for example, random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer. Examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene, and norbornadiene. Among these polyolefins, cyclic alkenes are preferred, and norbornene is more preferred. Styrene is also included as an example of a constituent monomer.

The carboxylic acid-modified polyolefin is a polymer obtained by modifying the polyolefin by block polymerization or graft polymerization with a carboxylic acid. Examples of the carboxylic acid to be used for the modification include maleic acid, acrylic acid, itaconic acid, crotonic acid, maleic anhydride, and itaconic anhydride.

The carboxylic acid-modified cyclic polyolefin is a polymer obtained by replacing a portion of the monomers that form a cyclic polyolefin with an α,β-unsaturated carboxylic acid or an anhydride thereof, and copolymerizing them, or by block-polymerizing or graft-polymerizing an α,β-unsaturated carboxylic acid or an anhydride thereof onto a cyclic polyolefin. The cyclic polyolefin to be modified with a carboxylic acid is the same as described above. The carboxylic acid to be used for the modification is the same as that used for the modification of the carboxylic acid-modified polyolefin.

Among these resin components, a carboxylic acid-modified polyolefin is preferred, and carboxylic acid-modified polypropylene is more preferred.

The heat-sealable resin layer 4 may be formed using one resin component alone, or may be formed using a blend polymer obtained by combining two or more resin components. Furthermore, the heat-sealable resin layer 4 may be composed of only one layer, or two or more layers formed of the same resin component or different resin components.

In the battery packaging material of the present invention, the heat-sealable resin layer 4 may contain a lubricant. While the lubricant is not particularly limited, it is preferably an amide-based lubricant, for example. While the amide-based lubricant is not particularly limited so long as it has an amide group, preferred examples thereof include fatty acid amides and aromatic bis-amides. These lubricants may be used alone or in combinations of two or more.

Examples of fatty acid amides include saturated fatty acid amides, unsaturated fatty acid amides, substituted amides, methylol amides, saturated fatty acid bis-amides, and unsaturated fatty acid bis-amides. Specific examples of saturated fatty acid amides include lauramide, palmitamide, stearamide, behenamide, and hydroxystearamide. Specific examples of unsaturated fatty acid amides include oleamide and erucamide. Specific examples of substituted amides include N-oleyl palmitamide, N-stearyl stearamide, N-stearyl oleamide, N-oleyl stearamide, and N-stearyl erucamide. Specific examples of methylol amides include methylol stearamide. Specific examples of saturated fatty acid bis-amides include methylene-bis-stearamide, ethylene-bis-capramide, ethylene-bis-lauramide, ethylene-bis-stearamide, ethylene-bis-hydroxystearamide, ethylene-bis-behenamide, hexamethylene-bis-stearamide, hexamethylene-bis-behenamide, hexamethylene hydroxystearamide, N,N'-distearyl adipamide, and N,N'-distearyl sebacamide. Specific examples of unsaturated fatty acid bis-amides include ethylene-bis-oleamide, ethylene-bis-erucamide, hexamethylene-bis-oleamide, N,N'-dioleyl adipamide, and N,N'-dioleyl sebacamide. Specific examples of fatty acid ester amides include stearamide ethyl stearates. Specific examples of aromatic bis-amides include m-xylylene-bis-stearamide, m-xylylene-bis-hydroxystearamide, and N,N'-distearyl isophthalamide.

When the heat-sealable resin layer 4 contains a lubricant, the content of the lubricant may be selected as appropriate, but is preferably about 700 to 1200 ppm, and more preferably about 800 to 1100 ppm. In the present invention, the content of the lubricant in the heat-sealable resin layer 4 corresponds to the total amount of the lubricant present inside the heat-sealable resin layer 4 and the lubricant present on the surface of the heat-sealable resin layer 4.

While the thickness of the heat-sealable resin layer 4 can be selected as appropriate, it is about 10 to 100 μm, and preferably about 15 to 50 μm.

[Adhesive Layer 5]

In the battery packaging material of the present invention, the adhesive layer 5 is a layer that is optionally provided between the barrier layer 3 and the heat-sealable resin layer 4, in order to strongly bond these layers.

The adhesive layer 5 is formed of an adhesive capable of bonding the barrier layer 3 and the heat-sealable resin layer 4. The adhesive to be used for forming the adhesive layer 5 is the same as those for the adhesive layer 2 in terms of adhesion mechanism, types of adhesive components, and the like. The adhesive component to be used for the adhesive layer 5 is preferably a polyolefin-based resin, more preferably a carboxylic acid-modified polyolefin, and particularly preferably carboxylic acid-modified polypropylene.

The thickness of the adhesive layer 5 is, for example, about 2 to 50 μm, and preferably about 15 to 30 μm.

3. Method for Producing Battery Packaging Material

The method for producing the battery packaging material of the present invention is not particularly limited so long as a laminate including layers each having a predetermined composition is obtained. Examples of methods for producing the battery packaging material of the present invention include a method comprising a lamination step of laminating at least a protective layer, a base material layer, a barrier layer, and a heat-sealable resin layer to obtain a laminate; and a curing step of curing the protective layer, wherein in the curing step, the protective layer is cured such that a maximum value A of absorbance detected in an infrared wavenumber range of 2800 to 3000 $cm^{-1}$ and a maximum value B of absorbance detected in an infrared wavenumber range of 2200 to 2300 $cm^{-1}$ satisfy the relation: $0.05 \leq B/A \leq 0.75$, as measured from an outermost surface of the protective layer, using attenuated total reflection Fourier transform infrared spectroscopy. Specifically, the battery packaging material of the present invention can be produced, for example, as follows:

Initially, a laminate in which at least the base material layer 1 and the barrier layer 3 are laminated in this order (the laminate may be hereinafter denoted as the "laminate A") is formed. For example, the laminate A can be formed using a dry lamination method as follows: The adhesive to be used for forming the adhesive layer 2 is applied to the base material layer 1 or the barrier layer 3 whose surface has been optionally subjected to a chemical conversion treatment, using a coating method such as a gravure coating method or a roll coating method, and dried. Then, the barrier layer 3 or the base material layer 1 is laminated thereon, and the adhesive layer 2 is cured.

Subsequently, the heat-sealable resin layer 4 is laminated on the barrier layer 3 of the laminate A. When the heat-sealable resin layer 4 is laminated directly on the barrier layer 3, a resin component that forms the heat-sealable resin layer 4 may be applied onto the barrier layer 3 of the laminate A, using a method such as a gravure coating method or a roll coating method. When the adhesive layer 5 is provided between the barrier layer 3 and the heat-sealable resin layer 4, examples of methods include the following: (1) a method in which the adhesive layer 5 and the heat-sealable resin layer 4 are co-extruded to be laminated on the barrier layer 3 of the laminate A (co-extrusion lamination method); (2) a method in which a laminate in which the adhesive layer 5 and the heat-sealable resin layer 4 are laminated is separately formed, and this laminate is laminated on the barrier layer 3 of the laminate A using a thermal lamination method; (3) a method in which the adhesive for forming the adhesive layer 5 is laminated on the barrier layer 3 of the laminate A by, for example, applying the adhesive onto the barrier layer 3 using an extrusion method or solution coating, followed by drying at a high temperature and baking, and then the heat-sealable resin layer 4 formed into a sheet in advance is laminated on the adhesive layer 5 using a thermal lamination method; and (4) a method in which the melted adhesive layer 5 is poured between the barrier layer 3 of the laminate A and the heat-sealable resin layer 4 formed into a sheet in advance, and simultaneously the laminate A and the heat-sealable resin layer 4 are bonded with the adhesive layer 5 interposed therebetween (sandwich lamination method). Next, the resin composition for forming the protective layer 6 is applied to the surface of the base material layer 1, and a portion of the isocyanate groups in the curing agent are reacted to cure the protective layer. Examples of methods for reacting a portion of the isocyanate groups in the curing agent include heating and light irradiation. For example, in the case of heating, an aging step of placing the laminate in an environment at a temperature of about 30 to 90° C. for about 24 to 120 hours is performed, which allows the protective layer to be adjusted such that the maximum value A of absorbance detected in an infrared wavenumber range of 2800 to 3000 $cm^{-1}$ and the maximum value B of absorbance detected in an infrared wavenumber range of 2200 to 2300 $cm^{-1}$ satisfy the relation: $0.05 \leq B/A \leq 0.75$, as measured using attenuated total reflection Fourier transform infrared spectroscopy. The step of forming the protective layer 6 on the surface of the base material layer 1 may be performed before the base material layer 1 and the barrier layer 3 are laminated. For example, the protective layer 6 may be formed on the surface of the base material layer 1, and then the barrier layer 3 may be formed on the surface of the base material layer 1 opposite to the protective layer 6. Alternatively, the base material layer 1 and the barrier layer 3 may be laminated, and then the protective layer 6 may be formed on the surface of the base material layer 1, before the heat-sealable resin layer 4 is laminated.

In the battery packaging material of the present invention, each of the layers that form the laminate may be optionally subjected to a surface activation treatment such as a corona treatment, a blast treatment, an oxidation treatment, or an ozone treatment, in order to improve or stabilize the film formability, lamination processing, suitability for final product secondary processing (pouching and embossing molding), and the like.

Furthermore, in the battery packaging material of the present invention, an ink may be printed on the surface of the protective layer 6, either before or after the battery packaging material is molded (i.e., molded to form a space to seal the battery elements therein), or before or after the battery elements are housed in the battery packaging material after being molded. While the printing method is not particularly limited, pad printing is preferred when the battery packaging material after being molded is to be printed. In the battery packaging material obtained by the method of the present invention, the maximum value A of absorbance detected in an infrared wavenumber range of 2800 to 3000 $cm^{-1}$ and the maximum value B of absorbance detected in an infrared wavenumber range of 2200 to 2300 $cm^{-1}$ satisfy the specific relation: $0.05 \leq B/A \leq 0.75$, as measured from an outermost surface of the protective layer 6, using attenuated total reflection Fourier transform infrared spectroscopy, and therefore, ink printing can be favorably performed even by pad printing in which an ink is likely to be rejected. Thus, for example, a printed bar code, a printed pattern, printed characters, or the like can be favorably formed on at least a portion of the surface of the protective layer 6. The ink to be used for printing is as described above.

4. Use of Battery Packaging Material

The battery packaging material of the present invention is used as a packaging material for hermetically sealing and housing battery elements such as a positive electrode, a negative electrode, and an electrolyte. That is, the battery elements can be housed in the packaging material formed of the battery packaging material of the present invention.

Specifically, a battery that uses the battery packaging material is provided as follows: A battery element comprising at least a positive electrode, a negative electrode, and an electrolyte is covered with the packaging material formed of the battery packaging material of the present invention such that a flange portion (region where the heat-sealable resin layer is brought into contact with itself) can be formed on the periphery of the battery element, while a metal terminal connected to each of the positive electrode and the negative electrode protrudes to the outside. Then, the heat-sealable resin layer in the flange portion is heat-sealed with itself to hermetically seal the battery element. When the battery packaging material of the present invention is used to house the battery element, it is used such that the heat-sealable resin portion of the battery packaging material of the present invention is positioned on the inner side (surface that contacts the battery element) thereof.

Since the above-described battery packaging material of the present invention is used in the battery of the present invention, an ink can be favorably printed on, for example, the surface of the battery obtained after the battery elements are sealed with the molded battery packaging material, and an information-carrying portion is favorably formed by printing, for example, a bar code, a pattern, or characters on at least a portion of the surface of the battery.

The battery packaging material of the present invention may be used for either primary batteries or secondary batteries, preferably secondary batteries. While the type of secondary battery to which the battery packaging material of the present invention is applied is not particularly limited, examples include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the battery packaging material of the present invention is applied include lithium ion batteries and lithium ion polymer batteries.

EXAMPLES

The present invention will be hereinafter described in detail with reference to examples and comparative examples; however, the present invention is not limited to the examples.

Examples 1 to 3, and Comparative Examples 1 and 2

<Production of Battery Packaging Materials>

A barrier layer 3 formed of aluminum foil (thickness: 40 μm), whose both surfaces had been subjected to a chemical conversion treatment, was laminated on a base material layer 1 formed of a stretched nylon film (thickness: 25 μm), using a dry lamination method. Specifically, a two-liquid urethane adhesive (a polyol compound and an aromatic isocyanate-based compound) was applied to one surface of the aluminum foil to form an adhesive layer 2 (thickness: 4 μm) on the barrier layer 3. Subsequently, the adhesive layer 2 on the barrier layer 3 and the base material layer 1 were laminated together by applying pressure and heat, and then subjected to an aging treatment to prepare a laminate having the base material layer 1/the adhesive layer 2/the barrier layer 3. The chemical conversion treatment of the aluminum foil used as the barrier layer 3 was performed by applying a treatment solution containing a phenol resin, a chromium fluoride compound, and phosphoric acid to both surfaces of the aluminum foil using a roll coating method, such that the amount of chromium applied became 10 mg/m$^2$ (dry mass), followed by baking under conditions such that the film temperature became 180° C. or higher.

Subsequently, an acid-modified polypropylene resin (thickness: 23 μm) and a polypropylene resin (thickness: 23 μm) for forming a heat-sealable resin layer 4 on the barrier layer 3 side of the laminate were co-extruded in a molten state (250° C.) to laminate the heat-sealable resin layer 4 (thickness: 46 μm) on the barrier layer 3. Next, a resin composition for forming a protective layer 6 (a resin composition containing 20% by mass of a polyester polyol having a hydroxyl value of 7 mg KOH/g and a weight average molecular weight of 15000, 15% by mass of tolylene diisocyanate (TDI), i.e., an aromatic diisocyanate curing agent as an isocyanate group-containing curing agent, and 65% by mass of methyl ethyl ketone as a solvent) was applied onto the base material layer 1, using a gravure coating method, to form the protective layer 6 (thickness: 3 μm) on the surface of the base material layer 1. This resulted in a battery packaging material formed of a laminated film in which the protective layer 6/the base material layer 1/the adhesive layer 2/the barrier layer 3/the heat-sealable resin layer 4 were laminated in this order. The battery packaging materials of Examples 1 to 3, and Comparative Examples 1 and 2, after the lamination of the layers, were each subjected to aging under the conditions shown in Table 1.

Examples 4 to 6, and Comparative Examples 3 and 4

In Examples 4, 5, and 6, battery packaging materials were each prepared as in Examples 1, 2, and 3, except that a filler (silica particles with an average particle diameter of 1.0 μm) was added such that the proportion in the resin composition for forming the protective layer 6 was 10% by mass. In Comparative Examples 3 and 4, battery packaging materials were each prepared as in Comparative Examples 1 and 2, except that a filler (silica particles with an average particle diameter of 1.0 μm) was added such that the proportion in the resin composition for forming the protective layer 6 was 10% by mass. The battery packaging materials of Examples 4, 5, and 6, and Comparative Examples 3 and 4, after the lamination of the layers, were each subjected to aging under the conditions shown in Table 1.

[Measurement of B/A of Protective Layer]

Using Nicolet 380 from Thermo Scientific Inc., each of the battery packaging materials obtained above was subjected to measurement of attenuated total reflection Fourier transform infrared spectroscopy from the outermost surface of the protective layer. From the measurement results, the B/A value was calculated based on the maximum value A of absorbance detected in an infrared wavenumber range of 2800 to 3000 cm$^{-1}$ and the maximum value B of absorbance detected in an infrared wavenumber range of 2200 to 2300 cm$^{-1}$. The results are shown in Table 1. As used herein, the maximum value of absorbance refers to a maximum value of absorbance as measured using attenuated total reflection Fourier transform infrared spectroscopy, under the following conditions: accumulation times: 32, wavenumber resolution: 4 cm$^{-1}$. Specific measurement conditions for attenuated total reflection Fourier transform infrared spectroscopy were as set forth below.

(Measurement Conditions for Attenuated Total Reflection Fourier Transform Infrared Spectroscopy)

Prism: germanium
Wavenumber resolution: 4 cm$^{-1}$
Accumulation times: 32

Maximum value A of absorbance: a baseline was drawn by connecting between wavenumbers of 2750 and 3100 cm$^{-1}$ with a straight line, and the intensity from the baseline to the maximum value of absorbance in the range of 2800 to 3000 cm$^{-1}$ was determined as the maximum value A of absorbance.

Maximum value B of absorbance: a baseline was drawn by connecting between wavenumbers of 2000 and 2500 cm$^{-1}$ with a straight line, and the intensity from the baseline to the maximum value of absorbance in the range of 2200 to 2300 cm$^{-1}$ was determined as the maximum value B of absorbance.

[Evaluation of Electrolytic Solution Resistance]

A specimen having a size of 100 mm in width and 100 mm in length was cut from each of the battery packaging materials obtained above. Next, an electrolytic solution (composed of 1 M LiPF$_6$ and a mixture of ethylene carbonate, diethyl carbonate, and dimethyl carbonate (volume ratio: 1:1:1)) was dropped onto the surface of the protective layer, and allowed to stand in an environment at 24° C. and a relative humidity of 50% for 6 hours. The electrolytic solution was then wiped with ethanol. Change in the surface was examined. Here, the case where the surface showed no change was evaluated as A, and the case where the surface became discolored was evaluated as C. The results are shown in Table 1.

[Evaluation of Ink Printing Characteristics]

The surface of the protective layer of each of the battery packaging materials obtained above was subjected to pad printing, and the ink printing characteristics were evaluated. SPACE PAD 6GX from Mishima Co., Ltd. was used as a pad printing machine. UV Ink PJU-A Black from Navitas Co., Ltd. was used as an ink. Using Handy UV Lamp SUV-4 from As One Corporation, the ink printed on the surface of the protective layer was irradiated with UV light at an ultraviolet wavelength of 254 nm from a distance of 10 cm for 30 seconds, and cured. The area of the printed surface was 100 mm$^2$. The printed surface after curing was observed with an optical microscope, and the ink printing characteristics were evaluated based on the following criteria. Ink printing was performed in an environment at a temperature of 24° C. and a relative humidity of 50%. The results are shown in Table 1.

A: The proportion of unprinted portions in the entire printed pattern was less than 5%.

C: The proportion of unprinted portions in the entire printed pattern was more than 10%.

[Evaluation of Abrasion Resistance]

In accordance with the method defined in JIS P 8136, the protective layer of each of the battery packaging materials obtained above was subjected to an abrasion resistance test with 30 strokes, and the presence or absence of a scratch was visually observed. The case where the protective layer after the test had no scratch was evaluated as A, and the case where the protective layer after the test had scratches was evaluated as C. The results are shown in Table 1.

[Evaluation of Tape Adhesion]

Figure 3:
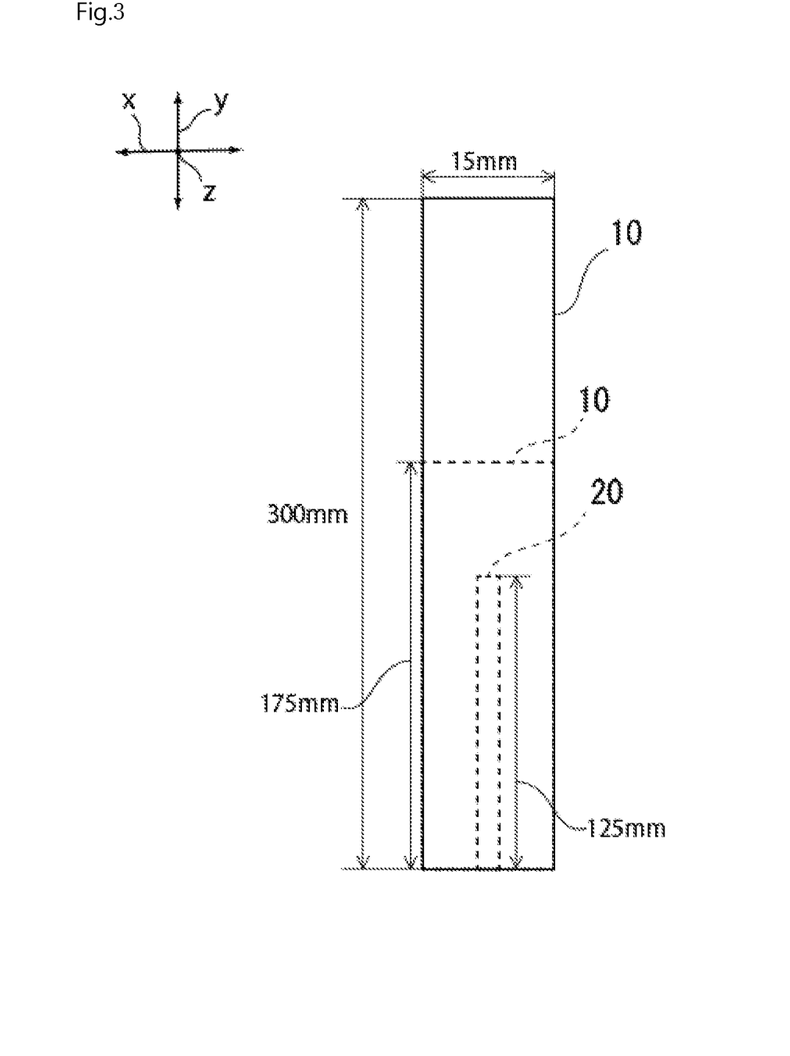
FIG. 3 is a schematic diagram for use in explaining a method for evaluating the tape adhesion.
Figure 4:
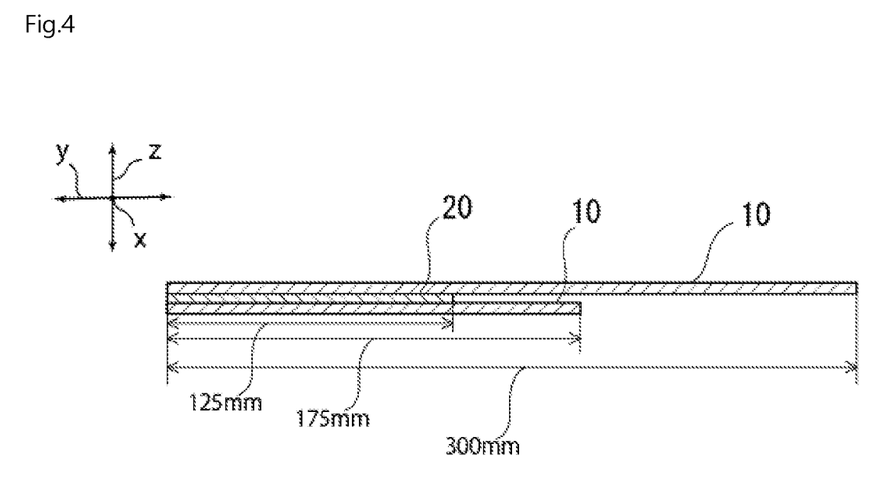
FIG. 4 is a schematic diagram for use in explaining the method for evaluating the tape adhesion.

As shown in FIGS. 3 and 4, each of the battery packaging materials 10 obtained above was cut into a size of 15 mm in width and 175 mm in length, and a double-faced adhesive tape 20 (tesa (registered trademark) 70415 from Tesa SE, Inc.) having a width of 5 mm and a length of 125 mm was attached to the surface of the protective layer. The surface of the protective layer of the battery packaging material 10 cut into a size of 15 mm in width and 300 mm in length was placed on the double-faced adhesive tape 20, and then the battery packaging material and the adhesive tape were pressure-bonded using a pressure-bonding apparatus as set forth in 10.2.4 of JIS-Z0237: 2009 Testing method for adhesive tapes and sheets. In an environment at a temperature of 24° C. and a relative humidity of 50%, the roller of the pressure-bonding apparatus having a mass of 2 kg was reciprocated twice at a speed of 10 mm/sec. After being pressure-bonded with the roller, the battery packaging material was stored at a temperature of 24° C. and 50% RH for 1 hour. Then, the battery packaging material cut into a size of 15 mm in width and 300 mm in length was folded over at 180° at an edge of the double-faced adhesive tape, and the battery packaging material was fixed between upper and lower chucks of a tensile testing machine. The battery packaging material was subjected to a tensile test at a peel angle of 180° and a speed of 50 mm/min, in an environment at a temperature of 24° C. and a relative humidity of 50%, and the adhesion of the tape was evaluated. The peel strength was determined as an average value of measurement values excluding those measured for an initial length of 25 mm and a last length of 20 mm. The tape adhesion was evaluated based on the following criteria. The results are shown in Table 1.

A: The peel strength was 5 N/5 mm or more.

B: The peel strength was 3 N/5 mm or more and less than 5 N/5 mm.

C: The peel strength was less than 3 N/5 mm.

TABLE 1

|  | Aging Conditions | Filler for Protective Layer | B/A | Electrolytic Solution Resistance | Ink Printing Characteristics | Abrasion Resistance Evaluation | Tape Adhesion |
| --- | --- | --- | --- | --- | --- | --- | --- |
| Comparative Example 1 | 3 days at 80° C. | No | 0 | A | C | A | C |
| Example 1 | 3 days at 70° C. | No | 0.10 | A | A | A | B |
| Example 2 | 3 days at 55° C. | No | 0.50 | A | A | A | B |
| Example 3 | 3 days at 45° C. | No | 0.70 | A | A | C | B |
| Comparative Example 2 | 3 days at 35° C. | No | 0.90 | C | A | C | A |
| Comparative Example 3 | 3 days at 80° C. | Yes | 0 | A | C | A | B |
| Example 4 | 3 days at 70° C. | Yes | 0.10 | A | A | A | A |
| Example 5 | 3 days at 55° C. | Yes | 0.50 | A | A | A | A |

TABLE 1-continued

| | Aging Conditions | Filler for Protective Layer | B/A | Electrolytic Solution Resistance | Ink Printing Characteristics | Abrasion Resistance Evaluation | Tape Adhesion |
|---|---|---|---|---|---|---|---|
| Example 6 | 3 days at 45° C. | Yes | 0.70 | A | A | C | A |
| Comparative Example 4 | 3 days at 35° C. | Yes | 0.90 | C | A | C | A |

As is clear from the results shown in Table 1, the battery packaging materials of Examples 1 to 6 in which the B/A value was adjusted in the range of 0.10 to 0.70 are found to be excellent not only in electrolytic solution resistance but also in ink printing characteristics. Furthermore, the battery packaging materials of Examples 1, 2, 5, and 6 in which the B/A value was adjusted in the range of 0.10 to 0.50 are found to be excellent not only in electrolytic solution resistance and ink printing characteristics, but also in abrasion resistance. The battery packaging materials of Examples 4, 5, and 6 in which the filler was added into the resin composition for forming the protective layer 6 are also found to be excellent in tape adhesion.

REFERENCE SIGNS LIST

1: base material layer
2: adhesive layer
3: barrier layer
4: heat-sealable resin layer
5: adhesive layer
6: protective layer

The invention claimed is:

1. A battery packaging material comprising:
   a laminate having at least a protective layer, a base material layer, a barrier layer, and a heat-sealable resin layer in this order, and
   an information-carrying portion fixed to a surface of the protective layer, wherein:
   the protective layer comprises:
      a urethane resin formed of at least one polyol selected from the group consisting of polyester polyols and acrylic polyols each having a hydroxyl group-containing group as a side chain, reacted with an aromatic diisocyanate curing agent,
   the information-carrying portion is formed by:
      applying, to at least a portion of the surface of the protective layer comprising unreacted isocyanate groups of the aromatic diisocyanate curing agent, an ink containing a component having functional groups that react with isocyanate groups, and
      curing the applied ink so that the functional groups in the ink react with the unreacted isocyanate groups on the surface of the protective layer, and
   a maximum value A of absorbance detected in an infrared wavenumber range of 2800 to 3000 $cm^{-1}$ and a maximum value B of absorbance detected in an infrared wavenumber range of 2200 to 2300 $cm^{-1}$ satisfy the relation: $0.10 \leq B/A \leq 0.50$, as measured from an outermost surface of the protective layer, using attenuated total reflection Fourier transform infrared spectroscopy.

2. The battery packaging material according to claim 1, further comprising an adhesive layer between the base material layer and the barrier layer.

3. The battery packaging material according to claim 1, further comprising an adhesive layer between the barrier layer and the heat-sealable resin layer.

4. The battery packaging material according to claim 3, wherein the adhesive layer is in direct contact with the barrier layer.

5. The battery packaging material according to claim 1, wherein the barrier layer is formed of aluminum foil.

6. The battery packaging material according to claim 1, wherein the urethane resin is formed of a polyester polyol having a hydroxyl group-containing group as a side chain, reacted with the aromatic diisocyanate curing agent.

7. A battery comprising a battery element comprising at least a positive electrode, a negative electrode, and an electrolyte, the battery element being housed in a package formed of the battery packaging material according to claim 1.

8. A method for producing the battery packaging material according to claim 1, the method comprising:
   laminating at least the protective layer, the base material layer, the barrier layer, and the heat-sealable resin layer to obtain the laminate; and
   curing the protective layer.

* * * * *